Jan. 18, 1955  L. PRAGALZ  2,699,623
FISHING ROD ATTACHMENT
Filed June 6, 1952
*Fig. 1.*
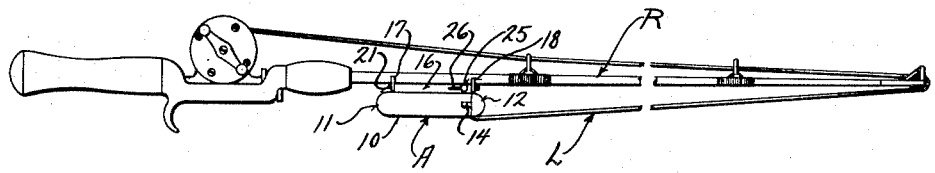
*Fig. 2.*  *Fig. 3.*
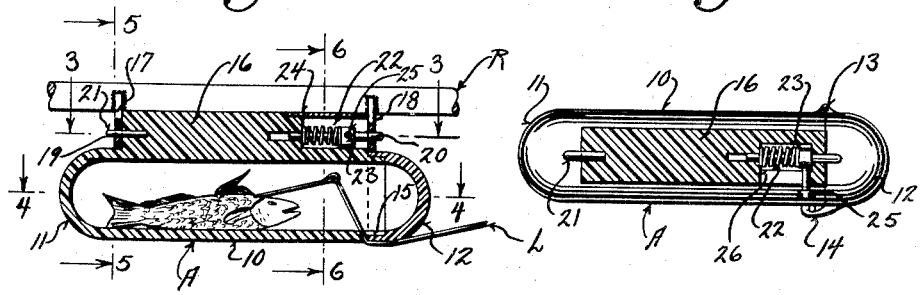
*Fig. 4.*  *Fig. 5.*
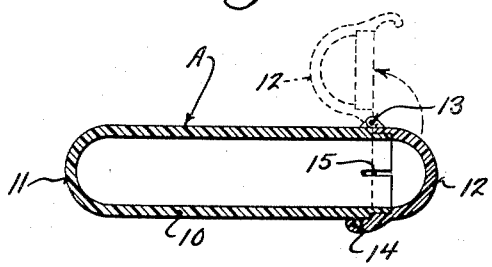 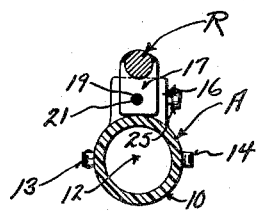
*Fig. 7.*  *Fig. 6.*
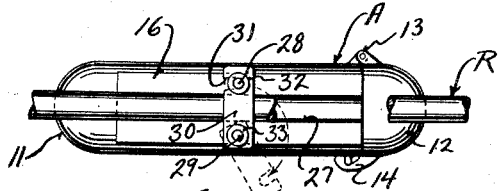 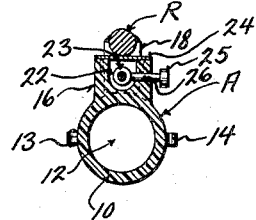
*Fig. 8.*
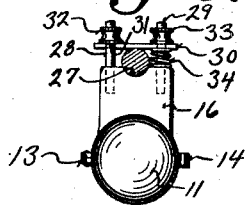
INVENTOR
LEO PRAGALZ
BY
*Munng & Wright*
ATTORNEYS United States Patent Office 2,699,623
Patented Jan. 18, 1955

2,699,623

FISHING ROD ATTACHMENT

Leo Pragalz, Sheboygan, Wis.

Application June 6, 1952, Serial No. 292,163

2 Claims. (Cl. 43—25.2)

This invention appertains to fishing and more particularly to a novel attachment for fishing rods for protecting a hook and bait when the rod is not in use.

It is well recognized by anglers, that an exposed hook, bait or lure presents quite a problem, particularly when the fisherman changes location along a stream or lake, in that the hook catches on foreign objects and the bait, specifically a live bait, suffers damage.

One of the primary objects of my invention is to provide a novel container for detachable connection with a rod or pole which will effectively receive and protect a hook and bait, when not in use, and which can receive water for maintaining the bait in a live fresh condition for a limited time, particularly when the rod is held in an upright or partially upright position.

Another salient object of my invention is to provide a container constructed in a novel manner for lying alongside of a fishing rod with a novel means for firmly and rigidly holding the container on the rod against displacement without interfering with the quick placing, or removal, of a hook or bait into or out of the container.

A further object of my invention is the provision of an attachment for a fishing rod or pole for receiving and protecting a hook and bait which will be durable and efficient in use, one that will be simple and easy to manufacture and one which can be placed upon the market at a reasonable cost.

A still further object of my invention is the provision of a container which can be readily molded from plastic or other material having a strengthening block extending longitudinally thereof for intimate contact with the pole or rod with means for connecting the block to the rod or pole, the container having a cover at one end forward of the block for permitting the placing and removal of a bait and hook into or out of the container.

With these and other objects in view, the invention consists in the novel construction, arrangement and formation of parts as will be hereinafter more specifically described and claimed and illustrated in the accompanying drawing, in which drawing, Figure 1 is a side elevational view of a fishing rod showing a preferred form of my attachment incorporated therewith.

Figure 2 is a longitudinal sectional view through the attachment showing the hook and bait within the container and the attachment secured to a rod, the rod being shown in partial side elevation.

Figure 3 is a longitudinal sectional view taken at right angles to Figure 2 and on the line 3—3 of Figure 2 looking in the direction of the arrows, the view showing the attachment removed from the rod.

Figure 4 is a longitudinal sectional view through the container itself taken on the line 4—4 of Figure 2 looking in the direction of the arrows and illustrating the hinged cover.

Figure 5 is a transverse sectional view taken on the line 5—5 of Figure 2 looking in the direction of the arrows and illustrating the means for detachably connecting the rear end of the container to the rod.

Figure 6 is a view similar to Figure 5 and taken on the line 6—6 of Figure 2 looking in the direction of the arrows and illustrating the means employed for detachably connecting the forward end of the container to the rod.

Figure 7 is a fragmentary top plan view illustrating a modified form of means for detachably connecting the container to a rod or pole.

Figure 8 is a front elevational view of the modified form of the invention as shown in Figure 7, the rod or pole being shown in transverse section.

Referring to the drawing in detail wherein similar reference characters designate corresponding parts throughout the several views, the letter A generally indicates my novel attachment for a fishing rod R.

The fishing rod R forms no part of the present invention and can be considered of a type now commonly used by fishermen.

My attachment A for protecting fish hooks, and lures and live bait, includes a substantially cylindrical container 10, preferably, but not necessarily formed from plastic. The iner or rear end of the container is closed by a rounded end wall 11, and the forward end of the container is open, but is normally closed by a rounded dome-shaped cover or cap 12. As illustrated (see Figures 2 and 4), the forward end of the container is rabbeted to form a seat on which the cap or cover 12 snugly fits. The cover can be hinged to the container, as at 13, and held in its closed position by any preferred type of latch 14. The forward edge of the container is slotted, as at 15, to receive a fishing line L, as will also later appear. If desired, the end wall 11 can also be made in the nature of a closure cap, so that the same can be removed from the body of the container to facilitate the cleaning of the interior of the container.

In accordance with my invention, I form on the body of the container a reinforcing solid block 16, which is adapted to snugly fit against the lower surface of the fishing rod directly in advance of the reel seat on the handle of the rod. The block 16 terminates short of the opposite ends of the container and is provided with flat, smooth end faces for a purpose which will also later appear.

Rigidly secured to the rod R are depending spaced bracket plates 17 and 18. The upper edges of these plates are curved or notched to snugly receive a rod, and where the rod is formed of steel, the plates can be welded or soldered thereto. Where the rod is formed from other materials, other means can be employed for securing the bracket plates in position.

The bracket plates 17 and 18 are so-spaced as to receive therebetween the ends of the reinforcing block 16, and the plates engage the flat end faces of the block to prevent movement of the attachment longitudinally of the rod. The plates 17 and 18 are provided respectively with keeper openings 19 and 20. Firmly anchored in the rear face of the block 16 is a pin 21 which is received in the opening 19 of the plate 17. The forward end of the block 16 is recessed to form a chamber 22 for receiving a sliding spring latch or bolt 23. If desired a cover plate 24, can be provided for the chamber. The bolt 23 normally extends outward of the block 16 for reception in the opening 20 of the plate 18 and the bolt is actuated by a laterally extending fingerpiece 25 movable in a slot 26 formed in the block 16 and opening into the chamber 22. If desired, the fingerpiece can carry a threaded nut for movement in frictional contact with the block 16, so as to hold the bolt 23 against accidental movement.

In use of my attachment, and when it is desired to associate the same with a rod, the rear end of the block 16 is moved between the plates 17 and 18 and the pin 21 is inserted in the opening 19 of the plate 17. The bolt 23 is now retracted and the block 16 is moved into intimate contact with the rod, after which the bolt is released so that the same can move into the opening 20 of the plate 18. The attachment is now firmly, but detachably secured to the rod and is ready for use.

The rod is used in the ordinary manner, and when a fisherman desires to change location, the line L is wound up on the reel and a fish hook, and live bait or lure, as the case may be, or placed within the body of the container, and the line L is led through the slot 15, after which the cover 12 is moved towards its closed position. The hook and bait will now be effectively protected and the catching of the hook in extraneous objects is prevented. Due to the formation of the container, and where a live bait is employed, the container can be filled or partially filled with water and the bait will thus be maintained in a fresh condition for a limited period of time, and the escape of water is prevented when the rod is held in an upright or partially upright position.

To remove the attachment it is merely necessary to slide back the bolt against the tension of its spring, and swing down the front end of the container and then pull the container forwardly to remove the pin 21 from the opening 19.

The device has been specially designed so as to be simple, yet durable, and so that the same can be manufactured at an extremely low cost.

In Figures 7 and 8, I have shown a modified form of means for connecting the attachment to a pole or rod. The container itself is of the same construction and form as shown in Figures 1 to 6. However, the block 16 preferably has its upper face provided with a longitudinal groove 27 to form a snug fit for the rod or pole. On each side of the groove 27 the block 16 has firmly anchored therein spaced upstanding posts 28 and 29. The post 29 has pivotally mounted thereon a swinging latch plate 30 and the plate is adapted to be swung over and across the fishing rod and into engagement with the post 28. The latch plate 30 is provided with a keeper notch 31 to receive the post 28. To retain the plate 30 in position the upper ends of the posts 28 and 29 can be threaded for the reception of nuts 32 and 33, and after the latch is swung over in place the nuts are threaded down so as to force the latch plate into intimate binding contact with the rod. An expansion spring 34 can be coiled around the post 29 to normally hold the latch plate 30 in a raised position when the nuts 32 and 33 are loosened.

Changes in details may be made without departing from the spirit or the scope of this invention, but what I claim as new is:

1. An attachment for fishing rods comprising a container open at one end for receiving and housing a fish hook and bait, a cover for normally closing the open end of the container, a reinforcing block extending longitudinally of the container and terminating short of the opposite ends thereof and having flat end faces, and spaced depending bracket plates for rigid connection with a rod, said plates being positioned snugly against the flat end faces of the block and having keeper openings therein, one end of said block having a rigid pin for reception in the opening of one plate and the opposite end of the block having a movable latch bolt for reception in the opening of the other plate, said block snugly engaging the rod between the plates.

2. An attachment for fishing rods comprising a container open at one end for receiving a part of a fishing line, a hook and a bait, a cover for closing said open end, a reinforcing block extending longitudinally of the container and terminating short of the opposite ends thereof for snug engagement with the under-surface of a fishing rod, depending bracket plates arranged in spaced relationship for engaging the ends of the block and for connection with a fishing rod, said plates having keeper openings, a pin rigidly carried by one end of the block for reception in the keeper opening of one plate, the opposite end of the block being provided with a chamber, and a spring latch bolt slidably mounted in the chamber for movement into the keeper opening of the other plate.

References Cited in the file of this patent

UNITED STATES PATENTS

| Number | Name | Date |
|---|---|---|
| 630,561 | Reid | Aug. 8, 1899 |
| 931,782 | Marguerettaz | Aug. 24, 1909 |
| 1,216,069 | Cammack | Feb. 13, 1917 |
| 1,634,030 | Korkames | June 28, 1927 |
| 1,904,110 | Willmann | Aug. 18, 1933 |
| 2,285,888 | Benton | June 9, 1942 |
| 2,583,660 | Moore | Jan. 29, 1952 |